United States Patent [19]
Kwok et al.

[11] Patent Number: 5,491,713
[45] Date of Patent: Feb. 13, 1996

[54] MINIMIZED OVERSAMPLING MANCHESTER DECODER

[75] Inventors: Peter W. Kwok, La Palma; Ira R. Feldman, Fullerton; Douglas A. Dwyer, Brea, all of Calif.

[73] Assignee: Hughes Aircraft Company, Los Angeles, Calif.

[21] Appl. No.: 56,015

[22] Filed: Apr. 28, 1993

[51] Int. Cl.$^6$ ............................. H03D 3/00; H04L 27/22
[52] U.S. Cl. ........................ 375/333; 375/278; 332/103; 329/304
[58] Field of Search ...................... 375/55, 87; 332/103; 329/304; 341/70

[56] References Cited

U.S. PATENT DOCUMENTS

| | | | |
|---|---|---|---|
| 4,361,895 | 11/1982 | Khoudari | 375/87 |
| 4,881,059 | 11/1989 | Saltzberg | 375/55 X |
| 4,912,730 | 3/1990 | Erhart | 375/87 X |

OTHER PUBLICATIONS

"Z85230/Z80230 ESCC Enhanced Serial Communication Controller," Technical Manual, Zilog, DPLL Digital Phase–Locked Loop, pp. 3–6 through 3–9.

*Primary Examiner*—Stephen Chin
*Assistant Examiner*—Bryan Webster
*Attorney, Agent, or Firm*—W. K. Denson-Low

[57] ABSTRACT

A Manchester decoder and clock recovery circuit for recovering Manchester encoded data and a clock synchronized with the incoming data. The circuit uses an oversampling rate of eight times the data rate, and a reduction in circuit elements to reduce the circuit power consumption requirements. The circuit operates in a search mode and in a tracking mode. A clock phase generator produces eight phase clocks, used by a sampling and majority vote circuit to determine the decoded data value. During the tracking mode, the phase of the synchronized clock can be adjusted during data reception.

23 Claims, 3 Drawing Sheets

MINIMIZED OVERSAMPLING MANCHESTER DECODER

BACKGROUND OF THE INVENTION

The present invention relates to digital data Manchester decoding system, and more particularly to a decoder which requires a reduced oversampling rate and reduced hardware complexity in comparison to conventional Manchester decoders.

Manchester encoding is a well known encoding technique, wherein there is a mid-bit transition from the "1" state to the "0" state, or vice versa, in the center of each bit cell. It is the direction of this transition that distinguishes a "1" from a "0".

Conventional devices for Manchester decoding have typically required a oversampling rate of at least sixteen times the data rate, and have been relatively hardware intensive. This results in relatively high power consumption rates, which can be especially disadvantageous for battery-powered circuits.

It is therefore an object of this invention to provide a Manchester decoder which employs a minimized sample rate and reduced hardware and thereby enjoys relatively low power consumption rates.

A further object of the invention is to provide a Manchester decoder circuit which will provide a system clock synchronized to the incoming data.

SUMMARY OF THE INVENTION

A decoder circuit is described for decoding incoming Manchester-encoded digital data characterized by an incoming data rate. In accordance with one aspect of the invention, the circuit employs noninverted and inverted versions of an oversampling clock signal at eight times the incoming data rate. The circuit comprises means clocked by the inverted oversampling clock for sampling the incoming data. Edge detection means responsive to the samples of the incoming data detects a change of state between successive data samples and provides an edge detection signal indicating that a change of state has been detected. The edge detection means is also clocked by the inverted oversampling clock.

A clock phase generation means responsive to the edge detection signal generates a system clock signal synchronized to the incoming data, and generates clock phase signals which mark preselected phases of the system clock signal. The clock phase generation means is clocked by the noninverted oversampling clock, in a preferred embodiment of the decoder circuit.

A sampling and majority vote circuit is responsive to the data samples and clock phase signals for sampling each data sample at intervals set by the clock phase signals and providing a decoded data value for each data sample in dependence on the interval sample values.

The Manchester decoder circuit can be operated in search and receive modes. The system clock signal can be adjusted during the receive mode to maintain synchronization with the incoming data.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
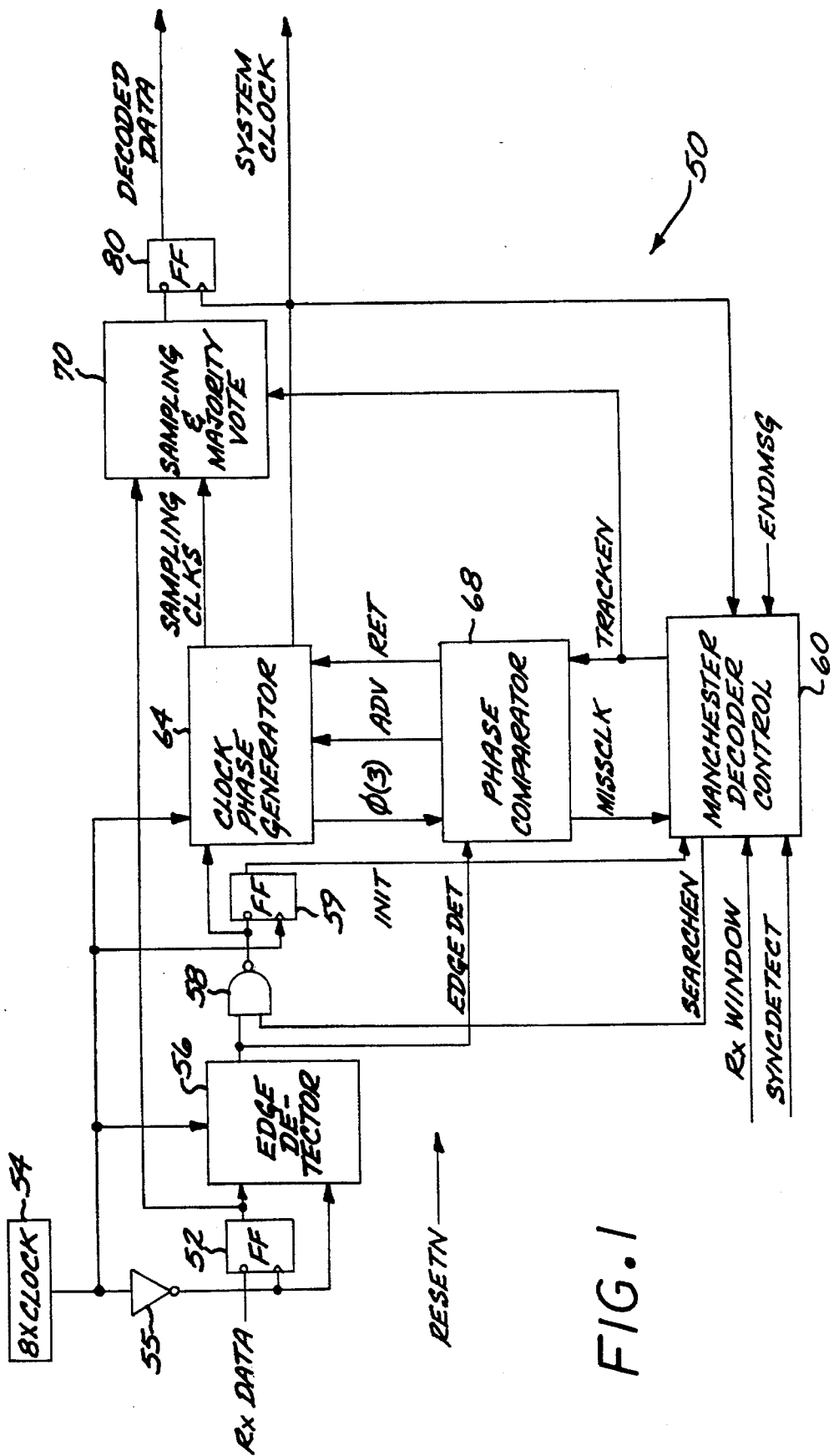
FIG. 1 is a schematic block diagram of a Manchester decoder and clock recovery circuit embodying this invention.

A preferred embodiment of a Manchester decoder and clock recovery circuit 50 is shown in FIG. 1. The incoming data, RXDATA, is clocked by a clock signal from clock 54, which has been inverted by inverter 55, into a flip-flop (FF) circuit at an oversampling rate determined by the clock 54. In accordance with one aspect of the invention, the oversampling rate determined by the clock signal from the clock 54 is eight times the rate of RXDATA. An edge detector 56, also clocked by the inverted clock signal, is responsive to the output of the FF 52 to detect edges on the output.

The output "EDGE DET" from the edge detector 56 is one input to NAND gate 58; the other input is the "SEARCHEN" signal generated by the Manchester decoder control logic 60. The NAND gate output "INIT" is sent to the Manchester decoder control logic circuit 60. The "EDGE DET" output from the edge detector 56 is also coupled to a phase comparator circuit 68.

The clock phase generator 64 generates sampling clocks which drive a sampling and majority vote circuit 70, three clock phase signals output to the phase comparator 68, and a system clock which is synchronized to the incoming data.

The phase comparator 68 outputs a "MISSCLK" signal to the control logic circuit 60, and signals "ADV" and "RET" to the phase comparator 64.

The decoder control logic circuit 60 receives external control signals RX WINDOW, SYNCDETECT and ENDMSG from circuits external to the decoder 50, the INIT signal from NAND gate 58, and the system clock from generator 64. The circuit 60 outputs SEARCHEN to the NAND gate 58, and a "TRACK ENABLE" signal to the phase comparator 68 and to the sampling and majority vote circuit 70. In a typical application for the circuit 50, a utilization system (not shown) processes the decoded data to detect synchronization by comparing the received data to a known pattern, and issues an active SYNCDETECT signal when the received pattern matches the known pattern.

The sampling and majority vote circuit 70 receives the sampled input data from the output of FF 52, the sampling clocks from generator 64, and the signal TRACKEN from the decoder control circuit 60. The output of the circuit 70 is passed to FF 80, which is clocked by SYSTEM CLOCK recovered by generator 64. The data output from the FF 80 is the decoded data.

The decoder and clock recovery circuit 50 operates in accordance with the following sequence of events. Operation commences with receipt of an active RX WINDOW signal from an external source such as a sequencer. In response, the decoder control circuit sends an active SEARCHEN signal to the clock phase generator 64 via the NAND gate 58, and maintains TRACKEN in an inactive state, making SYSTEM CLOCK "coast" or run without correction, i.e., with no phase jitter.

Once an edge has been detected by the edge detector 56 on the incoming data, indicated by an active signal EDGE DET, the circuit assumes this is the mid-bit of Manchester encoded data. The decoder circuit 60 turns off the SEARCHEN signal and sends an active TRACKEN signal one bit later.

Next, the phase comparator 68 tracks the edge (transition) time, and sends ADV or RET signals to the clock phase generator whenever necessary, signalling the generator to advance or retard the clock phase generator. In response to the ADV or RET signal, the generator 64 removes or inserts one clock state. The generator 64 supplies three clocks to the sampling and majority vote circuit 70 to sample the reclocked RX data from FF 52. The three samples are used by the circuit 70 to decode the data. Data decoding and tracking continues until RX WINDOW is not active.

In the event that a mid-bit transition is missed, i.e., a missing clock, the circuit 50 operates in the following manner. If the transition is missed prior to detection of a system synchronization pattern by external circuitry, i.e., before SYNCDETECT is active, the controller 60 sends an active SEARCHEN signal to the clock phase generator 64 via the NAND gate 58, and the signal TRACKEN is disabled. If the missing transition is detected after synchronization has been detected, the missing transition will simply be ignored.

Figure 2:
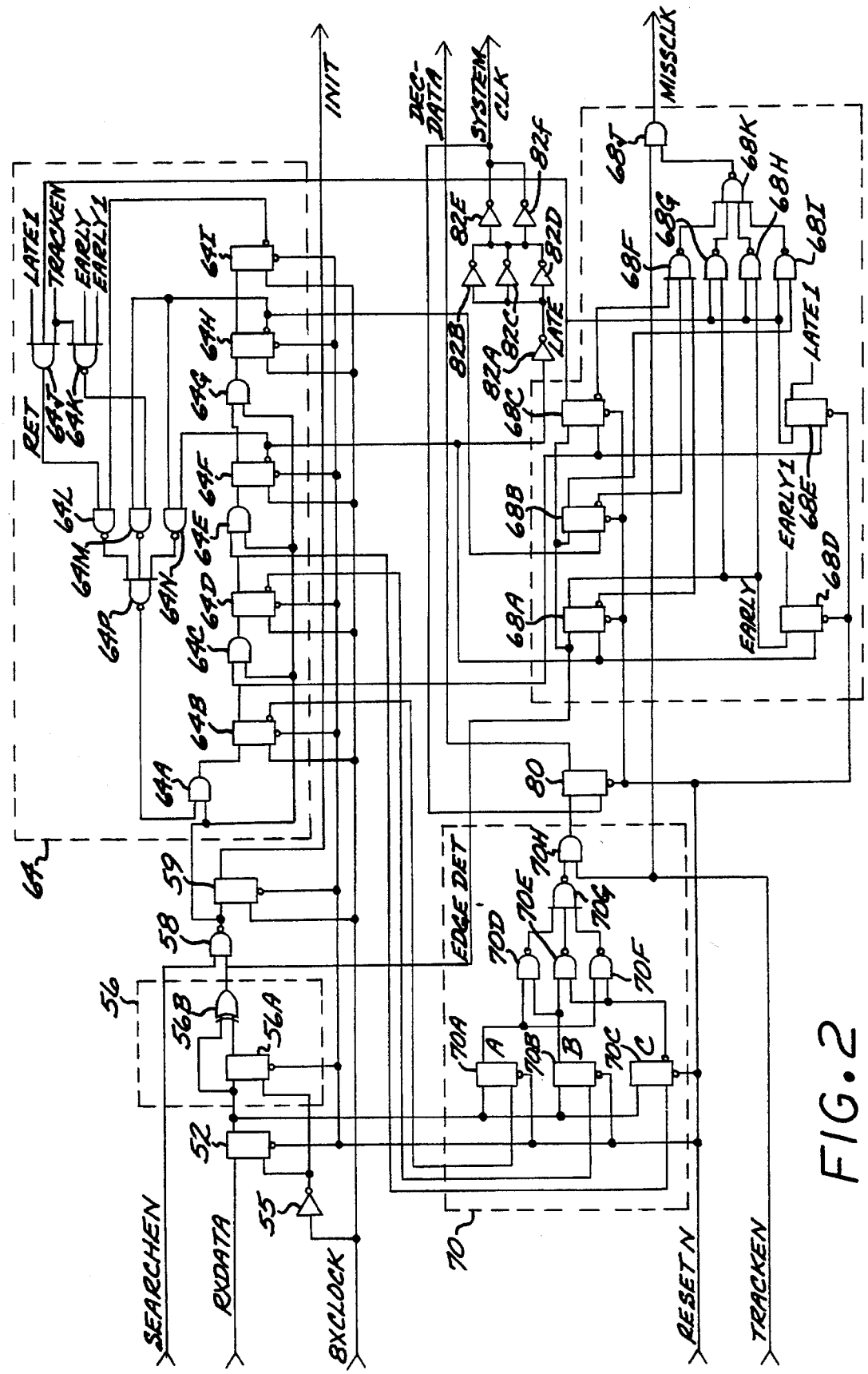
FIG. 2 is a detailed schematic diagram showing a portion of the circuit of FIG. 1 in further detail.

FIG. 2 is a schematic diagram of a possible implementation of the portion of the circuit 50 of FIG. 1 excluding the decoder control circuit 60. In this embodiment, the edge detector 56 comprises a FF 56A which receives the data output from FF 52, and is also clocked by the inverted oversampling clock from clock 54, thus providing a one oversampling clock period delay. The output of FF 56A is provided as an input to exclusive OR (XOR) gate 56B, together with a non-delayed version of the output from FF 52. The XOR gate output, EDGE DET, will therefore be active when the two inputs are at different logic levels, indicating a transition has occurred during the preceding oversampling clock period. The edge detector circuit 56 detects both rising and falling edges of the input data.

The NAND gate 58 receives as inputs the SEARCHEN signal from the control circuit 60 and the EDGE DET signal from circuit 56. The output of the NAND gate will be high unless both inputs are also high signals, and is therefore an active low signal. When no data is being received, and during the search mode when SEARCHEN is high, the NAND gate output will be high, since no edges are being detected, and the EDGE DET signal is low. Once an edge is detected, EDGE DET goes high, and the controller, in response to this, disables SEARCHEN, so that the output of the NAND gate goes low. The NAND gate output is input to the clock phase generator 64, and to the FF 59, whose clocked output is the INIT signal, provided to the decoder control circuit 60.

The clock phase generator 64 includes AND gate 64A which receives as an input the NAND gate 58 output. The AND gate 64A output is connected to the data port of FF 64B, which is clocked by the oversampling clock. This AND gate and FF arrangement is replicated three times, with gate 64C, FF 64D, gate 64E, FF 64F, gate 64G and FF 64H. The data output of FF 64H is connected to the data input of FF 64I; the inverted data output of FF 64H is connected to an input to NAND gates 64M and 64N. The inverted data output of FF 64I is connected to an input to NAND gate 64K. Each of the FF devices comprising the clock phase generator is clocked by the noninverted oversampling clock 54, at eight times the data rate.

The noninverted and inverted data outputs from the respective FF devices 64B, 64D, 64F and 64G provide eight clock states (0–7), which normally change cyclically. The inverted output of FF 64F is deemed phase state 4. The inverted output of FF 64H is taken as phase state 5, and the noninverted output of FF 64B is taken as phase state 6. The clock phase 0 is the inversion of phase state 4, and coincides with the rising edge of the system clock, which is synchronized to the received data. The phase of the system clock is adjusted during the receive mode, i.e., when TRACK ENABLE is active, and will have jitter. One phase state will be removed or inserted in response to ADV or RET signals from the phase comparator 68.

When the decoder 50 is in the search mode, i.e., when SEARCH ENABLE is active, any edge detected on the received data will force the next phase state to change from 4 (its initial state) to 5, putting this edge between clock phase 3 and 4. In order to avoid spikes during clock synchronization to RXDATA, the system clock phase is extended to phase 5. TRACKEN is activated at this time, and SEARCHEN is deactivated. The system clock will always be extended rather than shortened when synchronizing the system clock to incoming RFRXDATA. Spikes on the SYSTEM CLOCK are undesirable, since slow circuits comprising a typical utilization apparatus may not be able to tolerate high frequency spikes on this signal.

The clock phase generator 64 also produces a system clock signal, taken from the phase 4 clock signal, at the inverted output of FF 64F. The phase 4 clock signal is passed through an inverter chain comprising inverters 82A–82F, and the inverted phase 4 clock signal is taken as the system clock signal.

The phase comparator 68 comprises FFs 68A–68E and NAND gates 68F–68J. Each of FFs 68A–C receives at its data input the EDGE DET signal. FF 68A is clocked by the phase 4 clock signal, from the inverted output of FF 64F. The noninverted data output from FF 68A is the EARLY signal, and is connected to the data input of FF 68D and an input of NAND gate 68H. The inverted output of FF 68A is connected to an input of gate 68F.

FF 68B is clocked by the phase 5 clock signal, from the inverted output of FF 64H. The inverted output of FF 68B is connected to an input of gate 68F. The noninverted output is the on-time signal, and is connected to an input of gate 68I.

FF 68C is clocked by the phase 6 clock signal, from the noninverted output of FF 64B. The inverted output of FF 68C is connected to an input of gate 68F. The noninverted output is the LATE signal, connected to inputs of gates 68G, 68H, 68I and 64J, and to the data input of FF 68E.

FF 68D is clocked by the phase 4 clock signal. FF 68E is clocked by the phase 6 clock signal. Devices 68D and 68E hold the respective signal for one system clock. Corrections require two consecutive EARLY or LATE detections prior to advancing or retarding the clock phase; this acts as a noise filter to prevent excessive dithering.

The phase comparator 68 functions in the following manner. FFs 68A–C sample the edge detector output at clock phases 4, 5 and 6, respectively. The signal EARLY is generated if the edge is detected during phase 4. The signal LATE is generated if the edge is detected during phase 6. The signal MISSCLK is generated if the edge is not detected during any of these phases 4, 5 or 6. The signals EARLY, LATE and MISSCLK will only be generated if TRACKEN is active. The sampling and majority vote circuit 70 comprises FFs 70A–70C, NAND gates 70D–G and AND gate 70H. The received data from the FF 52 is connected to the data inputs of the FF 70A–C. FF 70A is clocked by the phase 2 clock signal, from the inverted output of FF 64B. FF 70B is clocked by the phase 3 clock signal from the inverted output of FF 64D. FF 70C is clocked by the phase 7 clock signal from the noninverted output of FF 64D. The noninverted output of FF 70A is connected to inputs of gates 70D and 70F. The noninverted output of FF 70B is connected to inputs of gates 70D and 70E. The noninverted output of FF 70C is connected to inputs of gates 70E and 70F. The outputs of gates 70D–F are connected to inputs of gate 70G. The input of gate 70G is connected to an input of gate 70H; TRACKEN is connected to the other input of gate 70H.

The output of gate 70H is connected to the data input of FF 80, which is clocked by the system clock signal. The noninverted output of FF 80 is the decoder output, i.e., the decoded data.

The sampling and majority vote circuit 70 operates in the following manner. The circuit samples the output of FF 52 at phases 2, 3 and 7. The circuit then determines the appropriate data value based on a "majority vote" of the three sample values. The majority vote logic is (AB+AC+BC)*TRACKEN, where "A" represents the output of FF 70A, "B" represents the output of FF 70B, and "C" represents the output of FF 70C (FIG. 2). The output of the gate 70H is re-clocked at FF 80 by the system clock to produce the decoded data. The decoded data remains at 0 until TRACKEN is active, so that the external utilization apparatus (not shown) does not produce a false synchronization detected signal. The utilization apparatus compares the received data to a known synchronization pattern, which cannot be all zeros.

Figure 3:
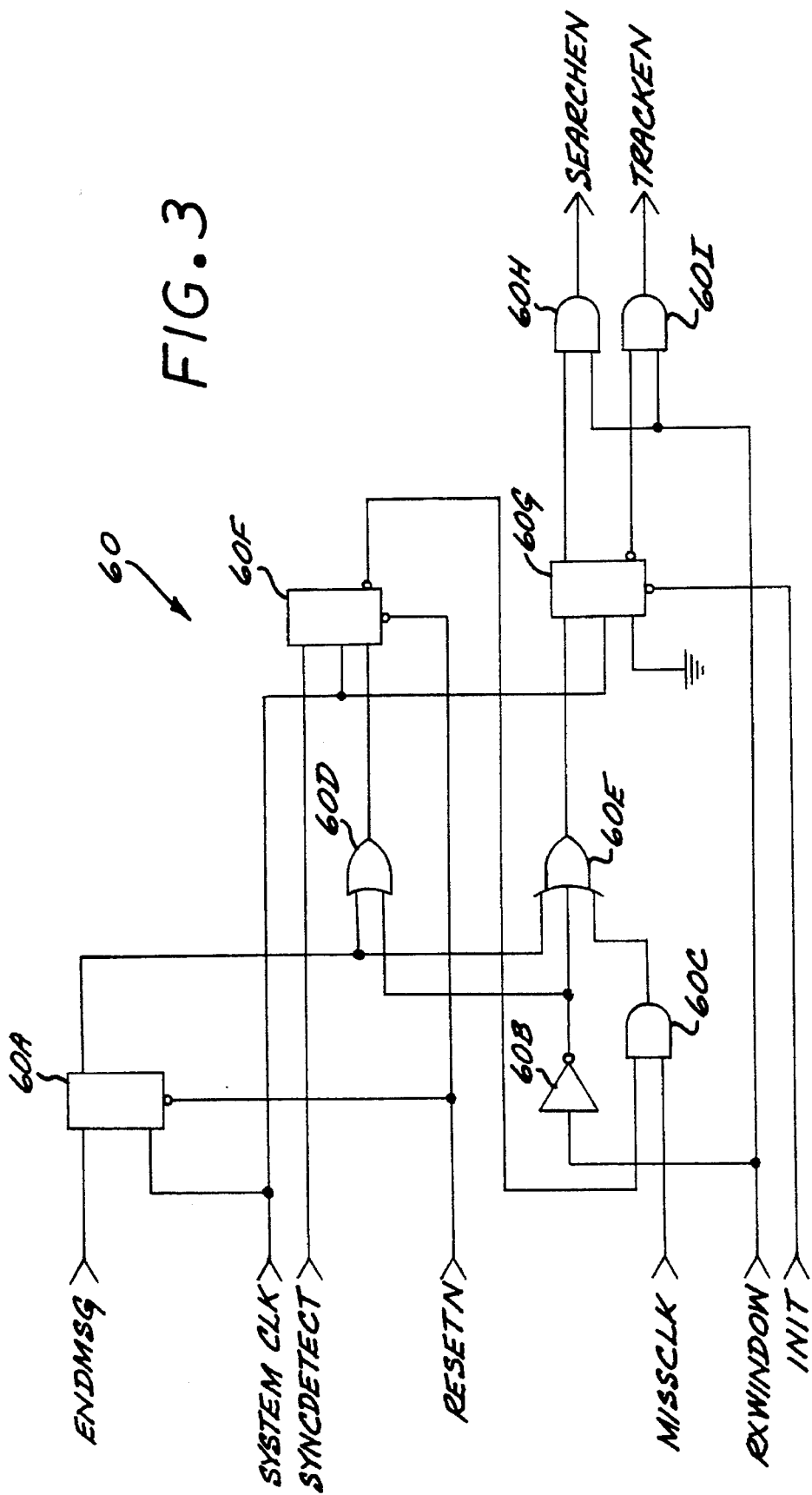
FIG. 3 is a detailed schematic diagram of the decoder control circuit of FIG. 1.

The Manchester decoder control circuit 60 is shown in FIG. 3. The circuit includes FF 60A, inverter 60B for inverting the RXWINDOW signal, AND gate 60C, OR gates 60D and 60E, FFs 60F and 60G, and AND gates 60H and 60I. The circuit 60 operates in the following manner. Before RXWINDOW becomes active, the circuit performs an internal reset function in response to externally supplied signal RESETN, and disables SEARCHEN and TRACKEN. Immediately after RXWINDOW becomes active, an active SEARCHEN signal is sent to the clock phase generator 64. Upon edge detection, i.e., upon receipt of an active INIT signal, SEARCHEN is disabled, and TRACKEN signal is made active one clock later. Prior to receipt of an active SYNCDETECT signal, if MISSCLK is active, then the circuit reverts back to the search mode by sending an active SEARCHEN signal and disabling TRACKEN.

A particular advantage of the circuit 50 is that the divide-by function of the clock phase generator 64 is achieved by fewer FF circuits than have previously been required. Moreover, phase decoding is performed without the need for another gate and FF circuit outside the divide-by-eight circuit. Another advantage is that the divide-by-eight circuit directly outputs the phase clock signals, i.e., the outputs of the FFs 64B, 64D, 64F and 64H are directly used as phase clock signals.

Another advantage of the circuit 50 is the use of an eight times oversampling rate, in comparison to the sixteen times sampling rate heretofore employed. This reduction in the oversampling rate can be achieved by sampling the received data by an inverted oversampling clock, while the clock phase generator is driven by the noninverted oversampling clock.

As a result of the reduction in the number of FFs and gates comprising the circuit, and the reduction in the oversampling rate, the decoder circuit 50 enjoys a reduction in its power consumption rate, in comparison with conventional Manchester decoders operated at an oversampling rate sixteen times the received data rate. This makes the circuit 50 particularly useful for battery-powered circuit applications.

Another advantage of the circuit 50 is the function of recovering a system clock synchronized with the incoming data. This system clock can be employed in utilization apparatus with which the decoder and clock recovery circuit 50 is used.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A decoder circuit for decoding incoming Manchester-encoded digital data characterized by an incoming data rate, wherein there is a mid-bit transition in the center of each Manchester data bit, the mid-bit transition occurring between half-bits, the decoder circuit comprising:

means for supplying noninverted and inverted versions of an encoder clock signal, said clock signal having an oversampling rate greater than said incoming data rate;

means for sampling said incoming Manchester-encoded digital data to provide samples of said incoming data, said sampling means clocked by said inverted encoder clock signal;

means responsive to said incoming data samples for detecting a change of state between successive data samples and providing a state change signal indicating that a change of state has been detected between successive data samples, said detecting means clocked by said inverted encoder clock signal;

means responsive to said state change signal for generating a system clock signal synchronized to said incoming data, and for generating a plurality of clock phase signals which mark preselected phases of said system clock signal, said generating means clocked by said noninverted oversampling clock; and decoding means responsive to said data samples and said clock phase signals for sampling the data samples such that each incoming Manchester data bit is sampled at at least three intervals set by said clock phase signals, said decoding means providing a decoded data value for the data samples in dependence on at least three interval sample values of said data sample, said decoding means comprising majority vote means for assigning said decoded data value as the value of the majority of said at least three interval sample values.

2. The decoder circuit of claim 1 wherein said sampling means comprises a flip/flop circuit clocked by said inverted oversampling clock signal.

3. The decoder circuit of claim 1 wherein said change of state detection means comprises exclusive OR logic means which provides an active output if and only if said successive data samples have different logic states.

4. The decoder circuit of claim 1 wherein said oversampling rate is equal to eight times said incoming data rate.

5. A decoder circuit for decoding incoming Manchester-encoded digital data characterized by an incoming data rate, wherein there is a mid-bit transition in the center of each Manchester data bit, the mid-bit transition occurring between half-bits, the decoder circuit comprising:

means for supplying noninverted and inverted versions of an encoder clock signal, said clock signal having an oversampling rate equal to eight times said incoming data rate;

means for sampling said incoming Manchester-encoded digital data to provide samples of said incoming data, said sampling means clocked by said inverted encoder clock signal;

edge detection means responsive to said incoming data samples for detecting a change of state between successive data samples and providing an edge detection signal indicating that a change of state has been detected between successive data samples, said detection means clocked by said inverted encoder clock signal;

means responsive to said edge detection signal for generating a system clock signal synchronized to said incoming data, and for generating a plurality of clock phase signals which mark preselected phases of said system clock signal, said generating means clocked by said noninverted oversampling clock; and decoding means responsive to said data samples and said clock phase signals for sampling the data samples such that each incoming Manchester data bit is sampled at a plurality of intervals set by said clock phase signals and providing a decoded data value for said data sample in dependence on said plurality of interval sample values of said data sample, wherein said plurality of intervals is at least three intervals, said plurality of interval sample values is at least three interval sample values, and wherein said decoding means comprises majority vote means for assigning said decoded data value in dependence on the majority of said at least three sample values.

6. The decoder circuit of claim 5 wherein said decoding means samples one incoming half-bit of a Manchester data bit one time to provide a first one of said interval sample values, and samples another half-bit of said Manchester data bit twice to provide second and third ones of said interval sample values.

7. The decoder circuit of claim 5 wherein said sampling means comprises a flip/flop circuit clocked by said inverted oversampling clock signal.

8. The decoder circuit of claim 5 wherein said edge detection means comprises exclusive OR logic means which provides an active output if and only if said successive data samples have different logic states.

9. A decoder circuit for decoding incoming Manchester-encoded digital data characterized by an incoming data rate, comprising:

means for supplying noninverted and inverted versions of an encoder clock signal, said clock signal having an oversampling rate greater than said incoming data rate;

means for sampling said incoming data to provide samples of said incoming data, said sampling means clocked by said inverted encoder clock signal;

means responsive to said incoming data samples for detecting a change of state between successive data samples and providing a state change signal indicating that a change of state has been detected between successive data samples, said detecting means clocked by said inverted encoder clock signal and comprising exclusive OR logic means which provides an active output if and only if said successive data samples have different logic states, said detecting means including an edge detection circuit which includes a flip/flop circuit responsive to said data samples and clocked by said inverted oversampling clock, said flip/flop circuit having a clocked output, and wherein said clocked output is connected to one input to said logic means and said data samples are connected to a second input of said logic means;

means responsive to said state change signal for generating a system clock signal synchronized to said incoming data, and for generating clock phase signals which mark preselected phases of said system clock signal, said generating means clocked by said noninverted oversampling clock; and decoding means responsive to said data samples and said clock phase signals for sampling said data samples at intervals set by said clock phase signals and providing decoded data values in dependence on said interval sample values of said data samples.

10. A decoder circuit for decoding incoming Manchester-encoded digital data characterized by an incoming data rate, comprising:

means for supplying noninverted and inverted versions of an encoder clock signal, said clock signal having an oversampling rate greater than said incoming data rate;

means for sampling said incoming data to provide samples of said incoming data, said sampling means clocked by said inverted encoder clock signal;

means responsive to said incoming data samples for detecting a change of state between successive data samples and providing a state change signal indicating that a change of state has been detected between successive data samples, said detecting means clocked by said inverted encoder clock signal;

means responsive to said state change signal for generating a system clock signal synchronized to said incoming data, and for generating clock phase signals which mark preselected phases of said system clock signal, said generating means clocked by said noninverted oversampling clock;

means for adjusting the phase of said system clock signal during reception of said incoming data to maintain synchronization of said system clock signal with said incoming data; and decoding means responsive to said data samples and said clock phase signals for sampling said data samples at intervals set by said clock phase signals and providing decoded data values in dependence on said interval sample values of said data samples.

11. The decoder circuit of claim 10 wherein said adjusting means comprises phase comparator means responsive to said change of state detection means and selective ones of said clock phase signals for providing control signals to said clock phase generation means to advance or retard said system clock signal.

12. A decoder circuit for decoding incoming Manchester-encoded digital data characterized by an incoming data rate, comprising:

means for supplying noninverted and inverted versions of an encoder clock signal, said clock signal having an oversampling rate greater than said incoming data rate;

means for sampling said incoming data to provide samples of said incoming data, said sampling means clocked by said inverted encoder clock signal;

means responsive to said incoming data samples for detecting a change of state between successive data samples and providing a state change signal indicating that a change of state has been detected between successive data samples, said detecting means clocked by said inverted encoder clock signal;

means responsive to said state change signal for generating a system clock signal synchronized to said incoming data, and for generating clock phase signals which mark preselected phases of said system clock signal, said generating means clocked by said noninverted oversampling clock, said clock phase generation means comprising a plurality of series-connected flip/flop stages clocked by said noninverted oversampling clock signal, and said clock phase signals are taken directly from selected outputs of selected ones of said stages; and decoding means responsive to said data samples and said clock phase signals for sampling said data samples at intervals set by said clock phase signals and providing decoded data incoming Manchester data bit at phases determined by said clock phase signals, and logic means for assigning a decoder data value for each such Manchester data bit in dependence on said at least three sample values.

13. A decoder circuit for decoding incoming Manchester-encoded digital data characterized by an incoming data rate, comprising:

means for supplying noninverted and inverted versions of an encoder clock signal, said clock signal having an oversampling rate greater than said incoming data rate;

means for sampling said incoming data to provide samples of said incoming data, said sampling means clocked by said inverted encoder clock signal;

means responsive to said incoming data samples for detecting a change of state between successive data samples and providing a state change signal indicating that a change of state has been detected between successive data samples, said detecting means clocked by said inverted encoder clock signal;

means responsive to said state change signal for generating a system clock signal synchronized to said incoming data, and for generating clock phase signals which mark preselected phases of said system clock signal, said generating means clocked by said noninverted oversampling clock;

decoding means responsive to said data samples and said clock phase signals for sampling said data samples at intervals set by said clock phase signals and providing decoded data values in dependence on said interval sample values of said data samples; and values in dependence on said interval sample values of said data samples.

14. The decoder circuit of claim 13 wherein said system clock is free running during said search mode.

15. A decoder circuit for decoding incoming Manchester-encoded digital data characterized by an incoming data rate, comprising:

means for supplying noninverted and inverted versions of an encoder clock signal, said clock signal having an oversampling rate greater than said incoming data rate;

means for sampling said incoming data to provide samples of said incoming data, said sampling means clocked by said inverted encoder clock signal;

means responsive to said incoming data samples for detecting a change of state between successive data samples and providing a state change signal indicating that a change of state has been detected between successive data samples, said detecting means clocked by said inverted encoder clock signal;

means responsive to said state change signal for generating a system clock signal synchronized to said incoming data, and for generating clock phase signals which mark preselected phases of said system clock signal, said generating means clocked by said noninverted oversampling clock; and decoding means responsive to said data samples and said clock phase signals for sampling the data samples such that each incoming Manchester data bit is sampled at at least three intervals set by said clock phase signals, said decoding means providing decoded data values in dependence on said interval sample values of said data samples, said decoding means comprising means for obtaining at least three sample values of each said data means for operating said circuit in a search mode for detecting the commencement of receipt of an incoming data message, said search mode means comprising means for forcing said decoding means to provide a constant data value during said search mode.

16. The decoder circuit of claim 15 wherein said logic means comprises majority vote logic means for assigning said decoder data value as the value of the majority of said multiple sample values.

17. A decoder circuit for decoding incoming Manchester-encoded digital data characterized by an incoming data rate, comprising:

means for supplying noninverted and inverted versions of an encoder clock signal, said clock signal having an oversampling rate equal to eight times said incoming data rate;

means for sampling said incoming data to provide samples of said incoming data, said sampling means clocked by said inverted encoder clock signal;

edge detection means responsive to said incoming data samples for detecting a change of state between successive data samples and providing an edge detection signal indicating that a change of state has been detected between successive data samples, said detection means clocked by said inverted encoder clock signal and comprising exclusive OR logic means which provides an active output if and only if said successive data samples have different logic states, said edge detection means further comprising a flip/flop circuit responsive to said data samples and clocked by said inverted oversampling clock, said flip/flop circuit having a clocked output, and wherein said clocked output is connected to one input to said logic means and said data samples are connected to a second input of said logic means;

means responsive to said edge detection signal for generating a system clock signal synchronized to said incoming data, and for generating clock phase signals which mark preselected phases of said system clock signal, said generating means clocked by said noninverted oversampling clock; and decoding means responsive to said data samples and said clock phase signals for sampling said data samples at intervals set by said clock phase signals and providing decoded data values in dependence on said interval sample values of said data samples.

18. A decoder circuit for decoding incoming Manchester-encoded digital data characterized by an incoming data rate, comprising:

means for supplying noninverted and inverted versions of an encoder clock signal, said clock signal having an oversampling rate equal to eight times said incoming data rate;

means for sampling said incoming data to provide samples of said incoming data, said sampling means clocked by said inverted encoder clock signal;

edge detection means responsive to said incoming data samples for detecting a change of state between successive data samples and providing an edge detection signal indicating that a change of state has been detected between successive data samples, said detection means clocked by said inverted encoder clock signal;

means responsive to said edge detection signal for generating a system clock signal synchronized to said incoming data, and for generating clock phase signals which mark preselected phases of said system clock signal, said generating means clocked by said noninverted oversampling clock;

means for adjusting the phase of said system clock signal during reception of said incoming data to maintain synchronization of said system clock signal with said incoming data; and decoding means responsive to said data samples and said clock phase signals for sampling said data samples at intervals set by said clock phase signals and providing decoded data values in dependence on said interval sample values of said data samples.

19. The decoder circuit of claim 18 wherein said adjusting means comprises phase comparator means responsive to said edge detection means and selective ones of said clock phase signals for providing control signals to said clock phase generation means to advance or retard said system clock signal.

20. A decoder circuit for decoding incoming Manchester-encoded digital data characterized by an incoming data rate, comprising:

means for supplying noninverted and inverted versions of an encoder clock signal, said clock signal having an oversampling rate equal to eight times said incoming data rate;

means for sampling said incoming data to provide samples of said incoming data, said sampling means clocked by said inverted encoder clock signal;

edge detection means responsive to said incoming data samples for detecting a change of state between successive data samples and providing an edge detection signal indicating that a change of state has been detected between successive data samples, said detection means clocked by said inverted encoder clock signal;

means responsive to said edge detection signal for generating a system clock signal synchronized to said incoming data, and for generating clock phase signals which mark preselected phases of said system clock signal, said generating means clocked by said noninverted oversampling clock, said clock phase generation means comprising a plurality of series-connected flip/flop stages clocked by said noninverted oversampling clock signal, and said clock phase signals are taken directly from selected outputs of selected ones of said stages; and decoding means responsive to said data samples and said clock phase signals for sampling said data samples at intervals set by said clock phase signals and providing decoded data values in dependence on said interval sample values of said data samples.

21. A decoder circuit for decoding incoming Manchester-encoded digital data characterized by an incoming data rate, wherein there is a mid-bit transition in the center of each Manchester data bit, the mid-bit transition occurring between half-bits, the decoder circuit comprising:

means for supplying noninverted and inverted versions of an encoder clock signal, said clock signal having an oversampling rate equal to eight times said incoming data rate;

means for sampling said incoming Manchester-encoded digital data to provide samples of said incoming data, said sampling means clocked by said inverted encoder clock signal;

edge detection means responsive to said incoming data samples for detecting a change of state between successive data samples and providing an edge detection signal indicating that a change of state has been detected between successive data samples, said detection means clocked by said inverted encoder clock signal;

means responsive to said edge detection signal for generating a system clock signal synchronized to said incoming data, and for generating clock phase signals which mark preselected phases of said system clock signal, said generating means clocked by said noninverted oversampling clock; and decoding means responsive to said data samples and said clock phase signals for sampling the data samples such that each incoming Manchester data bit is sampled at at least three intervals set by said clock phase signals, said decoding means providing decoded data values in dependence on said interval sample values of said data samples, said decoding means comprising means for obtaining multiple sample values of each said Manchester data bit at phases determined by said clock phase signals, and logic means for assigning a decoder data value for each such Manchester data bit in dependence on said multiple sample values.

22. The decoder circuit of claim 21 wherein said logic means comprises majority vote logic means for assigning said decoder data value as the value of the majority of said multiple sample values.

23. The decoder circuit of claim 1 wherein said decoding means samples one incoming half-bit of a Manchester data bit one time to provide a first one of said interval sample values, and samples another half-bit of said Manchester data bit twice to provide second and third ones of said interval sample values.

* * * * *